United States Patent
Park et al.

(10) Patent No.: US 9,826,489 B2
(45) Date of Patent: Nov. 21, 2017

(54) METHOD FOR REPORTING A POWER HEADROOM AND COMMUNICATION

(71) Applicant: LG Electronics Inc., Seoul (KR)

(72) Inventors: Sungjun Park, Seoul (KR); Youngdae Lee, Seoul (KR); Seungjune Yi, Seoul (KR); Sunghoon Jung, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/650,948

(22) PCT Filed: Jul. 21, 2014

(86) PCT No.: PCT/KR2014/006589
§ 371 (c)(1),
(2) Date: Jun. 10, 2015

(87) PCT Pub. No.: WO2015/068931
PCT Pub. Date: May 14, 2015

(65) Prior Publication Data
US 2015/0319716 A1    Nov. 5, 2015

Related U.S. Application Data

(60) Provisional application No. 61/901,008, filed on Nov. 7, 2013.

(51) Int. Cl.
*H04W 52/36*    (2009.01)
*H04W 24/02*    (2009.01)
*H04W 28/02*    (2009.01)
*H04W 16/32*    (2009.01)
*H04W 88/02*    (2009.01)
(Continued)

(52) U.S. Cl.
CPC ......... *H04W 52/365* (2013.01); *H04W 16/32* (2013.01); *H04W 24/02* (2013.01);
(Continued)

(58) Field of Classification Search
CPC ..................................................... H04W 28/04
(Continued)

(56) References Cited

U.S. PATENT DOCUMENTS

2011/0092217 A1* 4/2011 Kim ............... H04W 52/367
455/450
2012/0106477 A1* 5/2012 Kwon ............ H04W 52/365
370/329
(Continued)

FOREIGN PATENT DOCUMENTS

KR    10-2011-0050311 A    5/2011

OTHER PUBLICATIONS

Written Opinion issued in corresponding International Patent Application No. PCT/KR2014/006589 dated Nov. 24, 2014.
(Continued)

*Primary Examiner* — Samina Choudhry
(74) *Attorney, Agent, or Firm* — Morgan, Lewis & Bockius LLP

(57) ABSTRACT

There is provided a method for reporting a power headroom. The method may comprise: establishing, by a user equipment (UE), connections with plural base stations, each of which includes one or more cells; determining, by the UE, a power headroom for at least one base station among the plural base stations; and triggering, by the UE, a power headroom reporting (PHR) including the determined power headroom.

10 Claims, 18 Drawing Sheets

(51) Int. Cl.
*H04W 88/08* (2009.01)
*H04W 76/02* (2009.01)

(52) U.S. Cl.
CPC ...... *H04W 28/0215* (2013.01); *H04W 76/025* (2013.01); *H04W 88/02* (2013.01); *H04W 88/08* (2013.01)

(58) Field of Classification Search
USPC ........................................ 370/329
See application file for complete search history.

(56) References Cited

U.S. PATENT DOCUMENTS

| | | |
|---|---|---|
| 2012/0113919 A1 | 5/2012 | Kone |
| 2012/0196645 A1 | 8/2012 | Kim et al. |
| 2012/0207112 A1 | 8/2012 | Kim et al. |
| 2013/0121203 A1 | 5/2013 | Jung et al. |
| 2013/0176953 A1* | 7/2013 | Stern-Berkowitz . H04W 52/146 370/329 |
| 2015/0085760 A1* | 3/2015 | Yamada ................ H04W 24/10 370/329 |
| 2015/0181546 A1* | 6/2015 | Freda ................ H04W 56/0015 370/336 |
| 2015/0351053 A1* | 12/2015 | Jeong ................... H04W 24/10 455/522 |

OTHER PUBLICATIONS

International Search Report issued in corresponding International Patent Application No. PCT/KR2014/006589 dated Nov. 24, 2014.

* cited by examiner

— · — Backhaul link within cluster

— · · — Backhaul link between small cells and macro cell

— · — Backhaul link within cluster
— · · — Backhaul link between small cells and macro cell — · — Backhaul link within cluster
— · · — Backhaul link between small cells and macro cell — · — Backhaul link within cluster

FIG. 17

| $C_7$ | $C_6$ | $C_5$ | $C_4$ | $C_3$ | $C_2$ | $C_1$ | X |
|---|---|---|---|---|---|---|---|
| P | V | Per-eNB PH ||||||
| P | V | PH (Type 2, PCell) ||||||
| R | R | $P_{CMAX,c}$ 1 ||||||
| P | V | PH (Type 1, PCell) ||||||
| R | R | $P_{CMAX,c}$ 2 ||||||
| P | V | PH (Type 1, SCell 1) ||||||
| R | R | $P_{CMAX,c}$ 3 ||||||

...

| P | V | PH (Type 1, SCell n) |
|---|---|---|
| R | R | $P_{CMAX,c}$ m |

METHOD FOR REPORTING A POWER HEADROOM AND COMMUNICATION

BACKGROUND OF THE INVENTION

Field of the Invention

The present invention relates to wireless communication, and more specifically, to a method for reporting a power headroom and communication device thereof.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Examples of techniques employed in the 3GPP LTE-A include carrier aggregation.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells. That is, the plurality of serving cells provides a user equipment with various services.

In recent, there is a discussion for adopting small cells.

SUMMARY OF THE INVENTION

In the related art as above explained, due to adoption of the small cells, it will be possible for the UE to have dual connectivities to both a conventional cell and a small cell. However, there is yet no concept and technique to realize dual connectivities.

Therefore, an object of the present invention is to provide solutions to realize dual connectivities.

To achieve these and other advantages and in accordance with the purpose of the present invention, as embodied and broadly described herein, there is provided a method for reporting a power headroom. The method may comprise: establishing, by a user equipment (UE), connections with plural base stations, each of which includes one or more cells; determining, by the UE, a power headroom for at least one base station among the plural base stations; and triggering, by the UE, a power headroom reporting (PHR) including the determined power headroom.

The method may further comprise: determining a power headroom for a cell belonging to the at least one base station; and triggering a PHR including the power headroom for the cell.

The power headroom may be determined per the base station. The power headroom per the base station may be determined based on a difference between a UE's total uplink transmit power toward the base station and a UE's total transmission power toward the base station. The at least one base station may be a small base station.

To achieve these and other advantages and in accordance with the purpose of the present invention, as embodied and broadly described herein, there is also provided a terminal for performing random access procedure. The terminal may comprise: a radio frequency (RF) unit configured to establish connections with plural base stations, each of which includes one or more cells; and a processor connected to the RF unit and configured to determine a power headroom for at least one base station among the plural base stations and trigger a power headroom reporting (PHR) including the determined power headroom.

According to the present disclosure, the above-explained problem may be solved. In more detail, since one example technique according to the present disclosure allows the UE to report PHR per a base station (i.e., eNodeB), a scheduler in the base station can allocate radio resources in consideration of UE's transmit power toward another base station so that the UE's total transmit power does not exceed a maximum transmit power.

BRIEF DESCRIPTION OF THE DRAWINGS

FIG. 17 shows an example of an improved MAC CE according to the present disclosure.

DETAILED DESCRIPTION OF EXEMPLARY EMBODIMENTS

Figure 1:
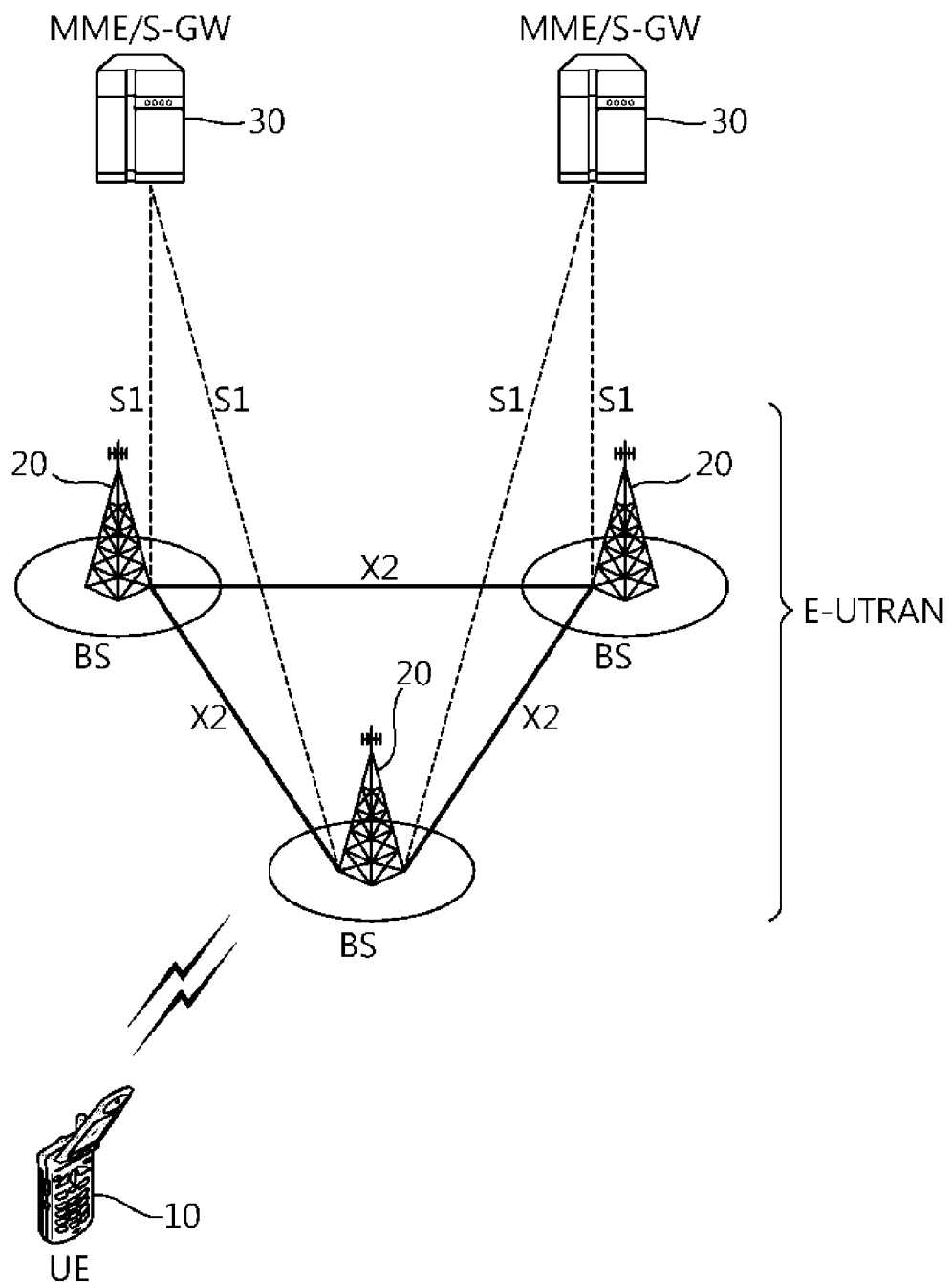
FIG. 1 shows a wireless communication system to which the present invention is applied.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
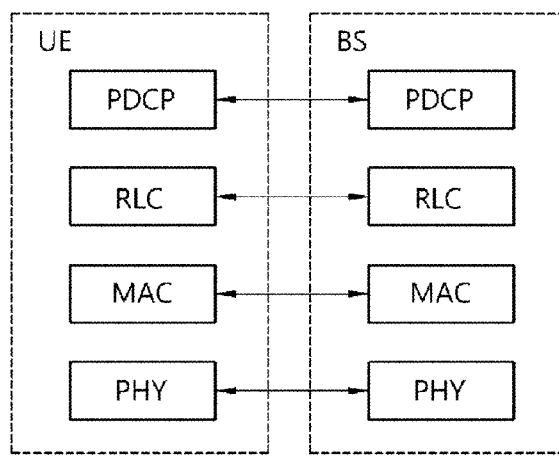
FIG. 2 is a diagram showing a radio protocol architecture for a user plane.
Figure 3:
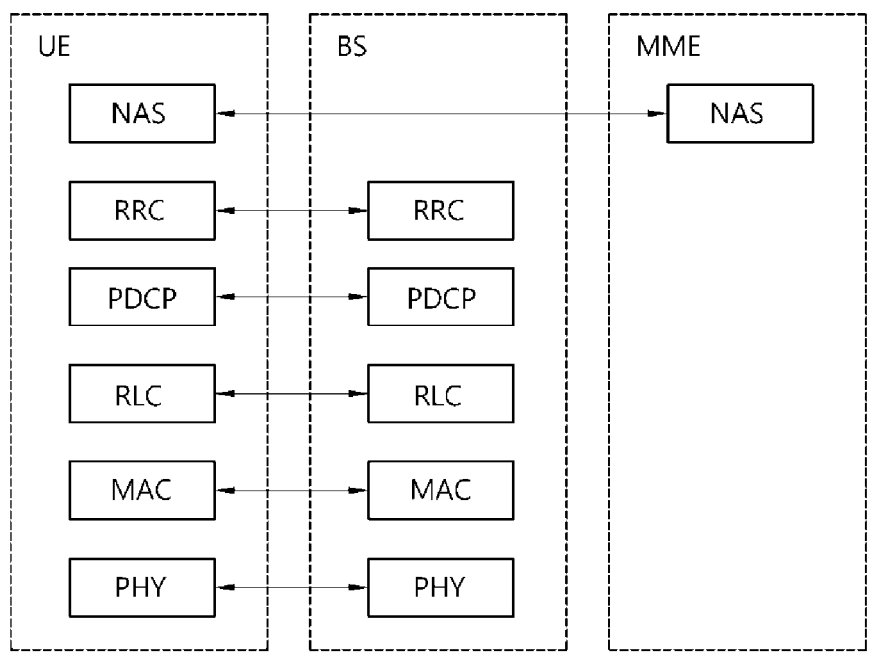
FIG. 3 is a diagram showing a radio protocol architecture for a control plane.

FIG. 2 is a diagram showing a radio protocol architecture for a user plane. FIG. 3 is a diagram showing a radio protocol architecture for a control plane.

The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
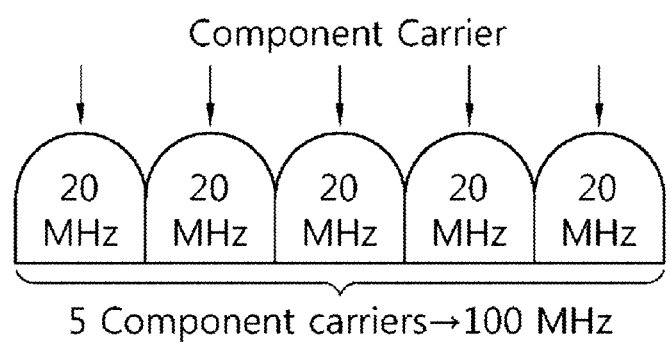
FIG. 4 shows an example of a wideband system using carrier aggregation for 3GPP LTE-A.

FIG. 4 shows an example of a wideband system using carrier aggregation for 3GPP LTE-A.

Referring to FIG. 4, each CC has a bandwidth of 20 MHz, which is a bandwidth of the 3GPP LTE. Up to 5 CCs may be aggregated, so maximum bandwidth of 100 MHz may be configured.

Figure 5:
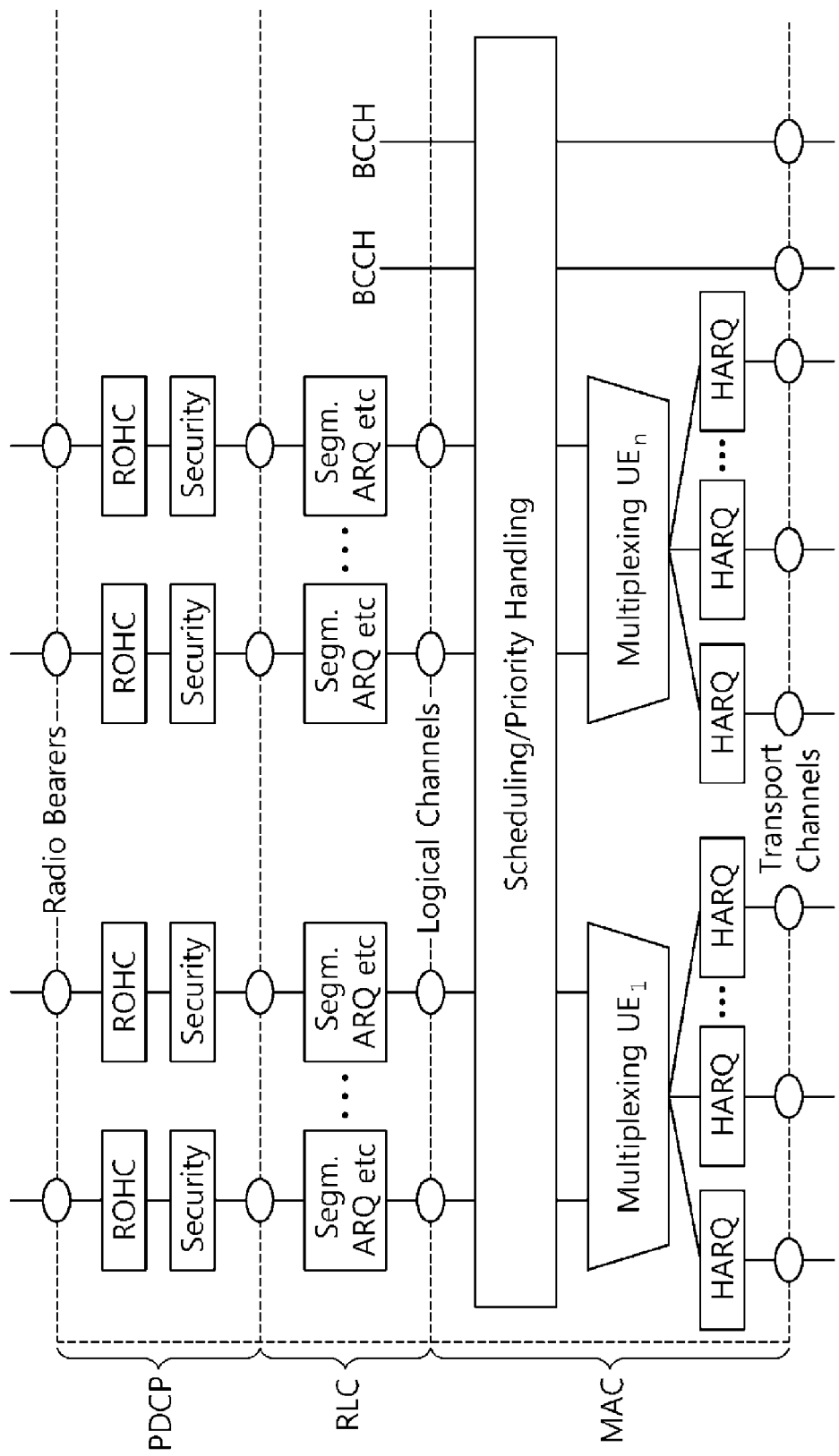
FIG. 5 shows an example of a structure of DL layer 2 when carrier aggregation is used.
Figure 6:
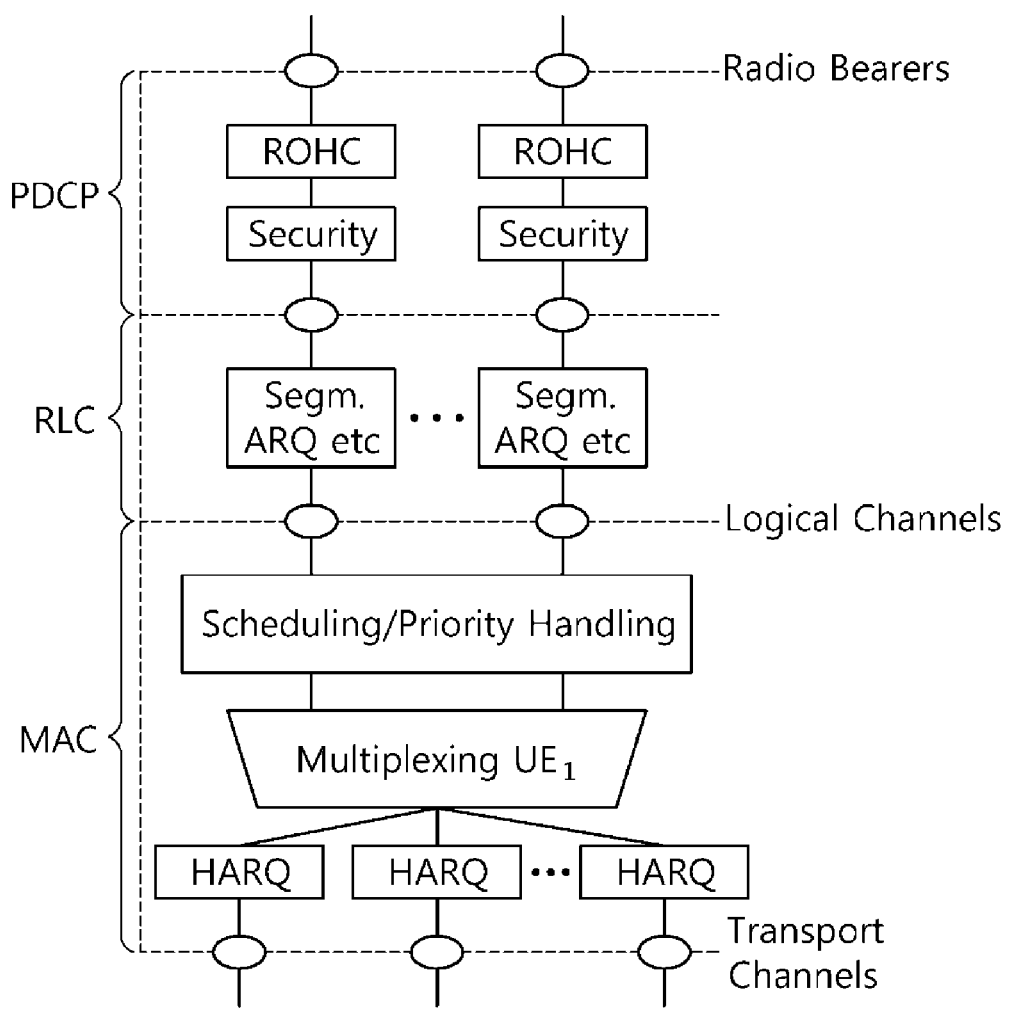
FIG. 6 shows an example of a structure of UL layer 2 when carrier aggregation is used.

FIG. 5 shows an example of a structure of DL layer 2 when carrier aggregation is used. FIG. 6 shows an example of a structure of UL layer 2 when carrier aggregation is used.

The carrier aggregation may affect a MAC layer of the L2. For example, since the carrier aggregation uses a plurality of CCs, and each hybrid automatic repeat request (HARQ) entity manages each CC, the MAC layer of the 3GPP LTE-A using the carrier aggregation may perform operations related to a plurality of HARQ entities. In addition, each HARQ entity processes a transport block independently. Therefore, when the carrier aggregation is used, a plurality of transport blocks may be transmitted or received at the same time through a plurality of CCs.

<Transmission Power of PUSCH>

Now, a transmission power of PUSCH will be described below. It may be referred to Section 5.1.1 of 3GPP TS 36.213.

Figure 7:
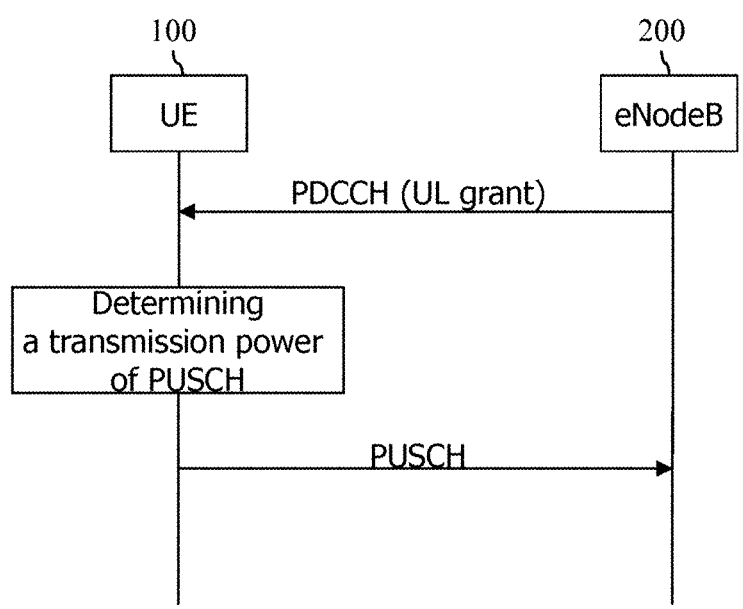
FIG. 7 shows an exemplary procedure for transmitting PUSCH.

FIG. 7 shows an exemplary procedure for transmitting PUSCH.

Referring to FIG. 7, when a UE 100 receives a PDCCH including an uplink (UL) grant from eNodeB 200, the UE 100 determines a power for transmitting a PUSCH. Then, the UE 100 transmits the PUSCH according the determined power.

The power for transmitting PUSCH is defined as follows.

If the UE 100 transmits PUSCH without a simultaneous PUCCH for the serving cell c, then the transmission power of the UE $P_{PUSCH,C(i)}$ for PUSCH transmission in subframe i for the serving cell c is calculated by $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} [dBm]$$ [Equation 1]

If the UE 100 transmits PUSCH simultaneous with PUCCH for the serving cell c, then the transmission power of the UE $P_{PUSCH,C(i)}$ for the PUSCH transmission in subframe i for the serving cell c is calculated by $$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$ [Equation 2]

[dBm]

If the UE 100 is not transmitting PUSCH for the serving cell c, for the accumulation of TPC command received with DCI format 3/3A for PUSCH, the UE 100 assumes that the transmission power of the UE $P_{PUSCH,C(i)}$ for the PUSCH transmission in subframe i for the serving cell c is calculated by $$P_{PUSCH,c}(i) = \min\{P_{CMAX,c}(i), P_{O\_PUSCH,c}(1) + \alpha_c(1) \cdot PL_c + f_c(i)\}$$ [Equation 3]

[dBm]

Where, $P_{CMAX,c(i)}$ is the configured UE transmission power in subframe i for serving cell c and $\hat{P}_{CMAX,c(i)}$ is the linear value of $P_{CMAX,c(i)}$. If the UE does not transmit PUCCH and PUSCH in subframe i for the serving cell c, for the accumulation of TPC command received with DCI format 3/3A for PUSCH, the UE may compute $P_{CMAX,c(i)}$ assuming MPR=0 dB, A-MPR=0 dB, P-MPR=0 dB and $T_C$=0 dB The $\hat{P}_{PUCCH}(i)$ is the linear value of $P_{PUCCH(i)}$. $M_{PUCSH,c(i)}$ is the bandwidth of the PUSCH resource assignment expressed in number of resource blocks valid for subframe i and serving cell c. $P_{O\_PUSCH,c(j)}$ is a parameter composed of the sum of a component $P_{O\_NOMINAL\_PUSCH,c(j)}$ provided from higher layers for j=0 and 1 and a component $P_{O\_UE\_PUSCH,c(j)}$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c(2)}$=0 and $P_{O\_NOMINAL\_PUSCH,C(2)} = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ are signalled from higher layers for serving cell c.

For j=0 or 1, $\alpha_c$={0, 0.4, 0.5, 0.7, 0.8, 0.9, 1} is a 3-bit parameter provided by higher layers for serving cell c. For j=2, $\alpha_c(j)$=1.

$PL_C$ is the downlink pathloss estimate calculated in the UE for serving cell c in dB and $PL_C$=referenceSignalPower–higher layer filtered RSRP, where referenceSignalPower is provided by higher layers and RSRP is defined for the reference serving cell and the higher layer filter configuration is defined for the reference serving cell. If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking is used as the reference serving cell for determining referenceSignalPower and higher layer filtered RSRP. If serving cell c belongs to a TAG not containing the primary cell then serving cell c is used as the reference serving cell for determining referenceSignalPower and higher layer filtered RSRP.

$\Delta_{TF,c}(i) = 10\log_{10}((2^{BPRE \cdot K_s} - 1) \cdot \beta_{offset}^{PUSCH})$ for $K_s$=1.25. $\Delta_{TF,c}(i)$=0 for $K_s$=0. Where, $K_s$ is given by the parameter deltaMCS-Enabled provided by higher layers for each serving cell c. BPRE and $\beta_{offset}^{PUSCH}$, for each serving cell c, are computed as below. $K_s$=0 for transmission mode 2.

BPRE=$O_{CQI}/N_{RE}$ for control data sent via PUSCH without UL-SCH data and $$\sum_{r=0}^{C-1} K_r/N_{RE}$$

for other cases.

Where c is the number of code blocks, $K_r$ is the size for code block r, $O_{CQI}$ is the number of CQI/PMI bits including CRC bits and $N_{RF}$ is the number of resource elements determined as $N_{RE}=M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are defined in [4].

$\beta_{offset}^{PUSCH}=\beta_{offset}^{CQI}$ for control data sent via PUSCH without UL-SCH data and $\beta_{offset}^{PUSCH}$=1 for other cases.

$\delta_{PUSCH,c}$ is a correction value, also referred to as a TPC command and is included in PDCCH/EPDCCH with DCI format 0/4 for serving cell c or jointly coded with other TPC commands in PDCCH with DCI format 3/3A whose CRC parity bits are scrambled with TPC-PUSCH-RNTI. The current PUSCH power control adjustment state for serving cell c is given by $f_{c(i)}$ which is defined by:

$f_c(i)=f_c(i-1)+\delta_{PUSCH,c}$ (i-$K_{PUSCH}$) if accumulation is enabled based on the parameter Accumulation-enabled provided by higher layers or if the TPC command $\delta_{PUSCH,c}$ is included in a PDCCH/EPDCCH with DCI format 0 for serving cell c where the CRC is scrambled by the Temporary C-RNTI.

Where $\delta_{PUSCH,c}$ (i—$K_{PUSCH}$) was signalled on PDCCH/EPDCCH with DCI format 0/4 or PDCCH with DCI format 3/3A on subframe i-$K_{PUSCH}$, and where fc(0) is the first value after reset of accumulation.

For FDD, the value of $K_{PUSCH}$ is 4. For TDD, if the UE is configured with more than one serving cell and the TDD UL/DL configuration of at least two configured serving cells is not the same, the "TDD UL/DL configuration" refers to the UL-reference UL/DL configuration for serving cell c For TDD UL/DL configurations 1-6, $K_{PUSCH}$ is given in below Table 1.

For TDD UL/DL configuration 0, if the PUSCH transmission in subframe 2 or 7 is scheduled with a PDCCH/EPDCCH of DCI format 0/4 in which the LSB of the UL index is set to 1, $K_{PUSCH}$=7 For all other PUSCH transmissions, $K_{PUSCH}$ is given in below Table 1.

For serving cell c, the UE attempts to decode a PDCCH/EPDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX or where serving cell c is deactivated.

If DCI format 0/4 for serving cell c and DCI format 3/3A are both detected in the same subframe, then the UE may use the $\delta_{PUSCH,c}$ provided in DCI format 0/4. $\delta_{PUSCH,c}$=0 dB for a subframe where no TPC command is decoded for serving cell c or where DRX occurs or i is not an uplink subframe in TDD.

The $\delta_{PUSCH,c}$ dB accumulated values signalled on PDCCH/EPDCCH with DCI format 0/4 are given in below table. If the PDCCH/EPDCCH with DCI format 0 is validated as a SPS activation or release PDCCH/EPDCCH, then $\delta_{PUSCH,c}$ is 0 dB.

The $\delta_{PUSCH}$ dB accumulated values signaled on PDCCH with DCI format 3/3A are one of SET1 given in below Table 2 or SET2 given in Table 3 as determined by the parameter TPC-Index provided by higher layers.

If the UE has reached $P_{CMAX,c(i)}$ for serving cell c, positive TPC commands for serving cell c may not be accumulated. If the UE has reached minimum power, negative TPC commands may not be accumulated. The UE reset accumulation.

For serving cell c, when $P_{O\_UE\_PUSCH,c}$ value is changed by higher layers

For serving cell c, when the UE receives random access response message for serving cell c. $f_c(i)=\delta_{PUSCH,c}(i-K_{PUSCH})$ if accumulation is not enabled for serving cell c based on the parameter Accumulation-enabled provided by higher layers.

Where $\delta_{PUSCH,c}(i-K_{PUSCH})$ is signalled on PDCCH/EPDCCH with DCI format 0/4 for serving cell c on subframe i-$K_{PUSCH}$ For FDD, $K_{PUSCH}$=4. For TDD, if the UE is configured with more than one serving cell and the TDD UL/DL configuration of at least two configured serving cells is not the same, the "TDD UL/DL configuration" refers to the UL-reference UL/DL configuration for serving cell c. For TDD UL/DL configurations 1-6, $K_{PUSCH}$ is given in Table 1.

For TDD UL/DL configuration 0. If the PUSCH transmission in subframe 2 or 7 is scheduled with a PDCCH/EPDCCH of DCI format 0/4 in which the LSB of the UL index is set to 1, $K_{PUSCH}$=7. For all other PUSCH transmissions, $K_{PUSCH}$ is given in Table 1.

The $\delta_{PUSCH,c}$ dB absolute values signaled on PDCCH/EPDCCH with DCI format 0/4 are given in Table 2. If the PDCCH/EPDCCH with DCI format 0 is validated as a SPS activation or release PDCCH/EPDCCH, then $\delta_{PUSCH,c}$ is 0 dB.

$f_c(i)=f_c(i-1)$ for a subframe where no PDCCH/EPDCCH with DCI format 0/4 is decoded for serving cell c or where DRX occurs or i is not an uplink subframe in TDD.

For both types of $f_c(*)$ (accumulation or current absolute) the first value is set as follows: If $P_{O\_UE\_PUSCH,c}$ value is changed by higher layers and serving cell c is the primary cell or, if $P_{O\_UE\_PUSCH,c}$ value is received by higher layers and serving cell c is a Secondary cell, $f_c(0)=0$.

Else, If the UE receives the random access response message for a serving cell c, $f_c(0)=\Delta P_{rampup,c}+\delta_{msg2,c}$, where $\delta_{msg2,c}$ is the TPC command indicated in the random access response corresponding to the random access preamble transmitted in the serving cell c $$\Delta P_{rampup,c} = \min\left[\left\{\max\left(0, P_{CMAX,c} - \begin{pmatrix} 10\log_{10}(M_{PUSCH,c}(0)) + \\ P_{O\_PUSCH,c}(2) + \delta_{msg2} + \\ \alpha_c(2) \cdot PL + \Delta_{TF,c}(0) \end{pmatrix}\right)\right\}, \Delta P_{rampuprequested,c}\right] \quad [Equation 4]$$

The $\Delta P^{rampuprequested,c}$ is provided by higher layers and corresponds to the total power ramp-up requested by higher layers from the first to the last preamble in the serving cell c, $M_{PUSCH,c(0)}$ is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c.

TABLE 1

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 2

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |

TABLE 2-continued

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 2 | 1 | 1 |
| 3 | 3 | 4 |

TABLE 3

| TPC Command Field in DCI format 3A | Accumulated $\delta_{PUSCH, c}$ [dB] |
|---|---|
| 0 | −1 |
| 1 | 1 |

If the total transmission power of the UE would exceed $\hat{P}_{CMAX}(i)$, the UE scales $\hat{P}_{PUSCH,c}(i)$ for the serving cell c in subframe i such that the condition.

$$\sum_c w(i) \cdot \hat{P}_{PUSCH,c}(i) \leq (\hat{P}_{CMAX}(i) - \hat{P}_{PUCCH}(i)) \quad \text{[Equation 5]}$$

is satisfied where $\hat{P}_{PUCCH}(i)$ is the linear value of $P_{PUCCH(i)}$, $\hat{P}_{PUSCH,c}(i)$ is the linear value of $P_{PUCCH,c}(i)$, $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where 0≤w(i)≤1. In case there is no PUCCH transmission in subframe i $\hat{P}_{PUCCH}(i)=0$.

If the UE has PUSCH transmission with UCI on serving cell j and PUSCH without UCI in any of the remaining serving cells, and the total transmission power of the UE would exceed $\hat{P}_{CMAX}(i)$, the UE scales $\hat{P}_{PUSCH,c}(i)$ for the serving cells without UCI in subframe i such that the following condition $$\sum_{c \neq j} w(i) \cdot \hat{P}_{PUSCH,c}(i) \leq (\hat{P}_{CMAX}(i) - \hat{P}_{PUSCH,j}(i)) \quad \text{[Equation 6]}$$

is satisfied where $\hat{P}_{PUSCH,j}(i)$ is the PUSCH transmission power for the cell with UCI and w(i) is a scaling factor of $\hat{P}_{PUSCH,c}(i)$ for serving cellc without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmission power of the UE still would exceed $\hat{P}_{CMAX}(i)$. Note that w(i) values are the same across serving cells when w(i)>0 but for certain serving cells w(i) may be zero.

If the UE has simultaneous PUCCH and PUSCH transmission with UCI on serving cell j and PUSCH transmission without UCI in any of the remaining serving cells, and the total transmission power of the UE would exceed $\hat{P}_{CMAX}(i)$, the UE obtains $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i))) \quad \text{[Equation 7]}$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i)) \quad \text{[Equation 8]}$$

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE may adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE may adjust its total transmission power to not exceed $P_{CMAX}$ on any overlapped portion.

If the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG the UE may drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s) the UE may drop the SRS transmissions if the total transmission power exceeds $P_{CMAX}$ on any overlapped portion of the symbol.

If the UE is configured with multiple TAGs, the UE may, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE may, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

<Power Headroom Reporting (PHR)>

Now, a Power Headroom Reporting (PHR) will be described below. It may be referred to Section 5.4.6 of 3GPP TS 36.321 V8.12.0 (2012-03).

To mitigate interference due to UL transmission, a transmit power of a UE needs to be adjusted. If the transmit power of the UE is too low, the BS barely receive UL data. If the transmit power of the UE is too high, the UL transmission may give too much interference to other UE's transmission.

Figure 8A:
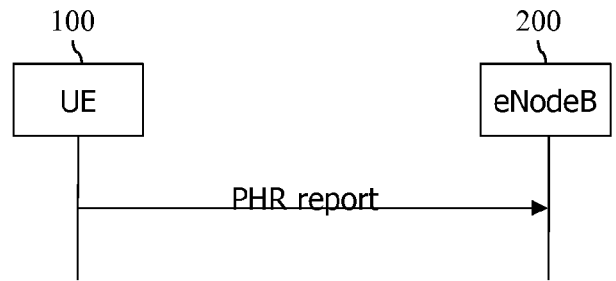
FIG. 8a shows a power headroom reporting (PHR) procedure.

FIG. 8a shows a power headroom reporting (PHR) procedure.

A power headroom reporting (PHR) procedure is used to provide the serving BS with information about the difference between the nominal UE maximum transmit power and the estimated power for UL-SCH transmission. RRC controls the power headroom reporting by configuring the two timers, a periodic timer and prohibit timer, and by signalling a pathloss threshold which sets the change in measured downlink pathloss to trigger the power headroom reporting.

The PHR may be triggered if any of the following events occur:
  prohibitPHR-Timer expires or has expired and the path loss has changed more than dl-PathlossChange dB since the transmission of a PHR when UE has UL resources for new transmission;
  periodicPHR-Timer expires;
  upon configuration or reconfiguration of the power headroom reporting functionality by upper layers, which is not used to disable the function.
If the UE has UL resources allocated for new transmission for this TTI:
  if it is the first UL resource allocated for a new transmission since the last MAC reset, start periodicPHR-Timer;
  if the PHR procedure determines that at least one PHR has been triggered since the last transmission of a PHR or this is the first time that a PHR is triggered, and;
  if the allocated UL resources can accommodate a PHR MAC control element plus its subheader as a result of logical channel prioritization:
    obtain the value of the power headroom from the physical layer;
    instruct the multiplexing and assembly procedure to generate and transmit a PHR MAC control element based on the value reported by the physical layer;
    start or restart periodicPHR-Timer;
    start or restart prohibitPHR-Timer;
    cancel all triggered PHR(s).

Figure 8B:
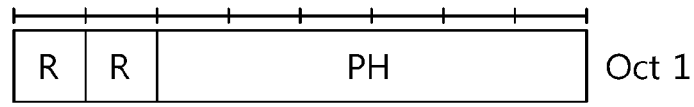
FIG. 8b shows an example of a PHR MAC CE.

FIG. 8b shows an example of a PHR MAC CE.

The UE may transmit the PHR through the PHR MAC CE to the BS. The PHR MAC CE is identified by a MAC PDU subheader with LCID. The LCID may be allocated for the PHR MAC CE in the UL-SCH, and a value of the LCID may be 11010. It has a fixed size and consists of a single octet defined as follows:
  R: reserved bit, set to "0";
  Power headroom (PH): this field indicates the power headroom level. The length of the field is 6 bits, so total 64 power headroom levels may be indicated. Table 4 shows the reported PH and the corresponding power headroom levels.

TABLE 4

| PH | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Figure 8C:
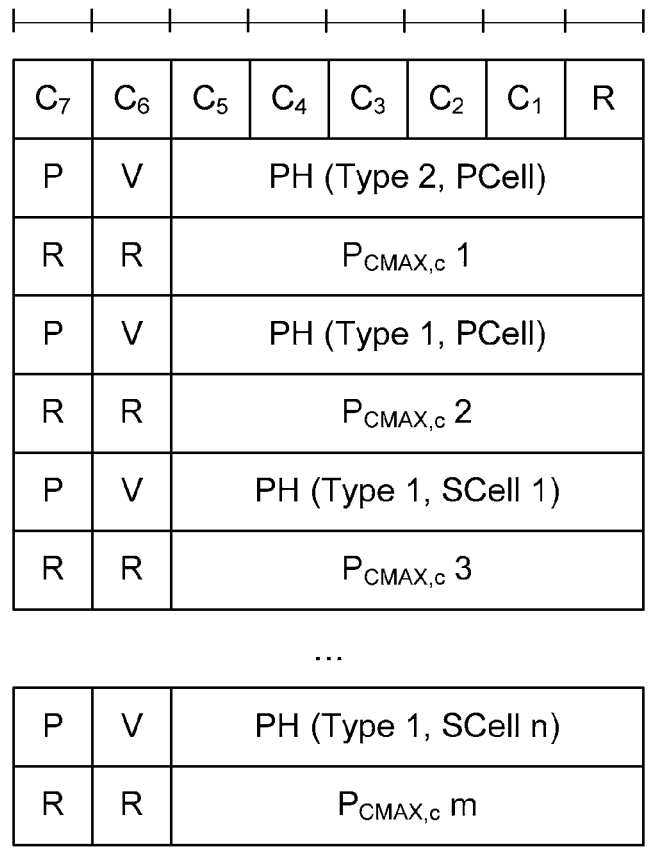
FIG. 8c shows an example of an extended PHR MAC CE.

FIG. 8c shows an example of an extended PHR MAC CE.

The Extended Power Headroom MAC control element is identified by a MAC PDU subheader with LCID. It has a variable size. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the ServCellIndex an octet with the Type 1 PH field and an octet with the associated $P_{CMAX,c}$ field (if reported), for the PCell and for each SCell indicated in the bitmap.

The Extended Power Headroom MAC Control Element is defined as follows:
  $C_i$: this field indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported;
  R: reserved bit, set to "0";
  V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;
  Power Headroom (PH): this field indicates the power headroom level. The length of the field is 6 bits. The reported PH and the corresponding power headroom levels are shown in Table 4.
  P: this field indicates whether the UE applies power backoff due to power management (as allowed by P-MPR$_c$). The UE shall set P=1 if the corresponding $P_{CMAX,c}$ field would have had a different value if no power backoff due to power management had been applied;
  $P_{CMAX,c}$: if present, this field indicates the $P_{CMAX,c}$ or $\tilde{P}_{CMAX,c}$ [2] used for calculation of the preceding PH field. The reported $P_{CMAX,c}$ and the corresponding nominal UE transmit power levels are shown in 5.

TABLE 5

| $P_{CMAX, c}$ | Nominal UE transmit power level |
| --- | --- |
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

<Small Cell>

Now, a concept of small cell will be described.

In the 3rd or 4th mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a small cell such as a pico cell or femto cell is adopted, a band higher than a frequency used in the existing cellular system may be used, and as a result, it is possible to transfer more information.

Figure 9:
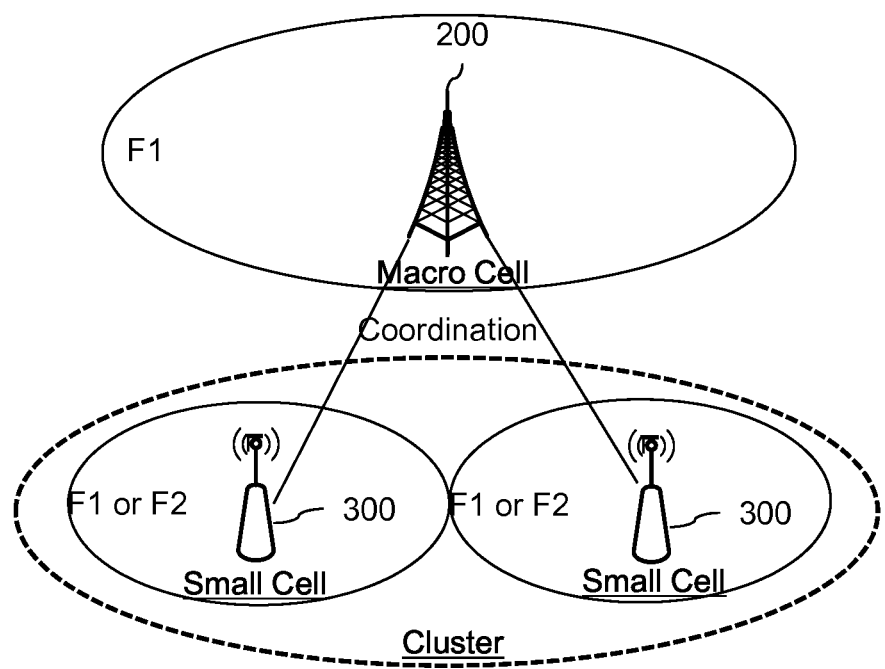
FIG. 9 shows one exemplary concept of coexistence of a macro cell and small cells.

FIG. 9 shows one exemplary concept of coexistence of a macro cell and small cells.

As shown in FIG. 9, a cell of a conventional BS or eNodeB (200) may be called as a macro cell over small cells. Each small cell is operated by each small BS or eNodeB (300). When the conventional BS or eNodeB (200) may operate in use of a frequency F1, each small cell operates in use of a frequency F1 or F2. Small cells may be grouped in a cluster. It is noted that actual deployment of small cells are varied depending on operator's policy.

Figure 10:
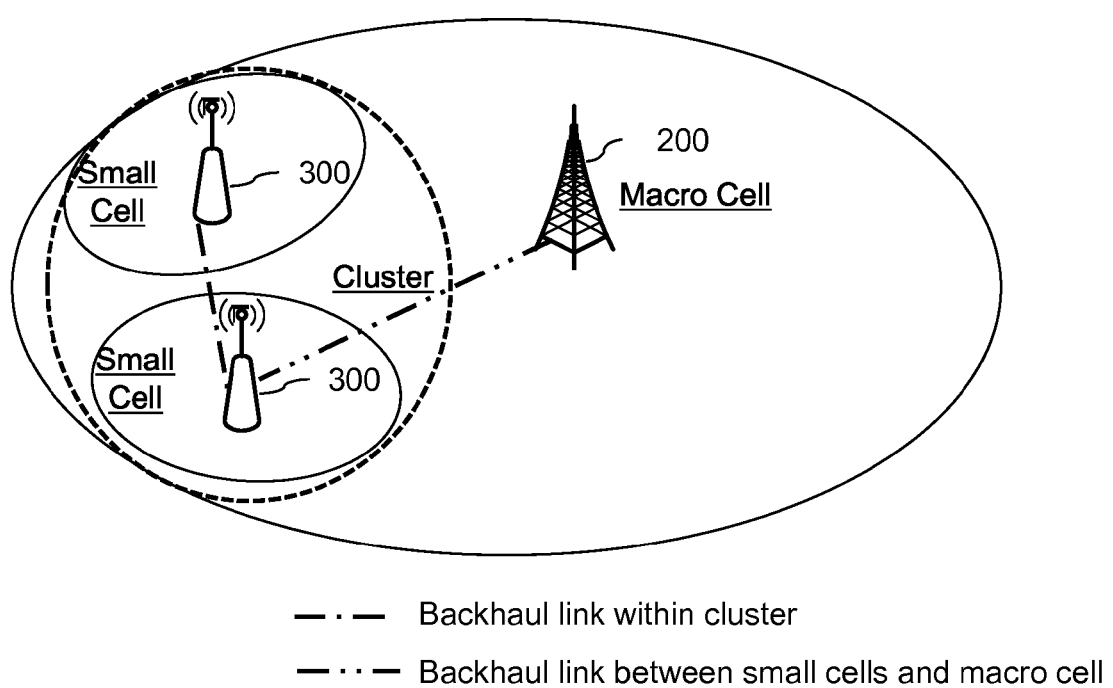
FIG. 10 shows one example of a first scenario of small cell deployment.

FIG. 10 shows one example of a first scenario of small cell deployment.

As shown in FIG. 10, the small cells may be deployed in the presence of an overlaid macro cell. That is, the small cells may be deployed in a coverage of the macro cell. In such deployment, the following may be considered.

Co-channel deployment of the macro cell and small cells
Outdoor small cell deployment
Small cell cluster is considered
The small cells are dense in cluster
Details regarding the number/density of small cells per cluster, backhaul link for coordination among small cells and time synchronization among small cells may also be considered
Both ideal backhaul and non-ideal backhaul may be also considered for the following interfaces: an interface between the small cells within the same cluster and an interface between a cluster of small cells and at least one macro eNodeB.
Non-ideal backhaul is assumed for all other interfaces.

Here, the non-ideal backhaul means that there may be a delay up to 60 ms.

Figure 11A:
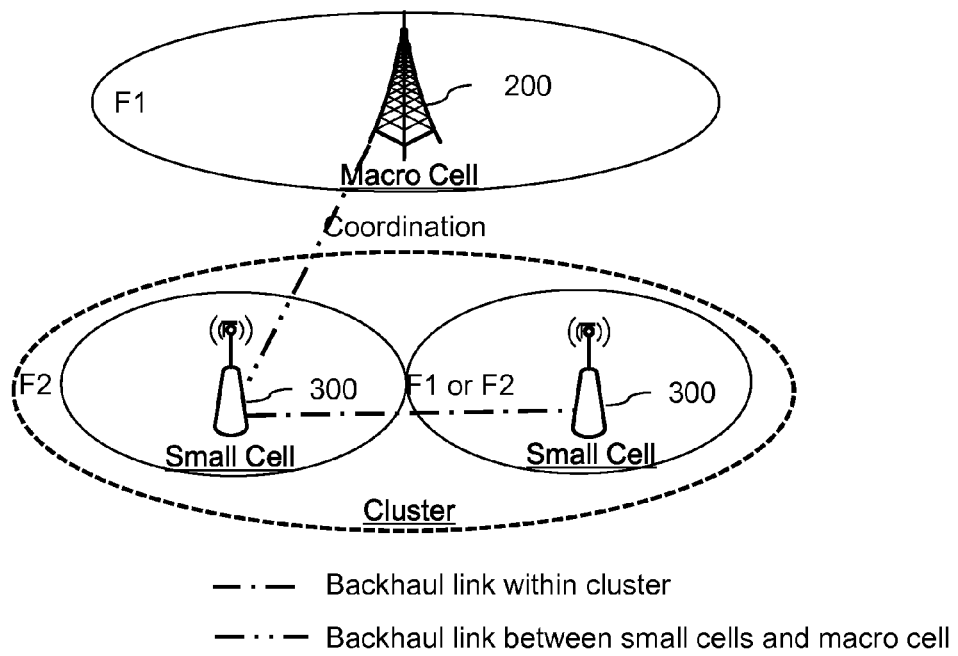
FIG. 11a shows one example of a second scenario of small cell deployment.

FIG. 11a shows one example of a second scenario of small cell deployment.

As shown in FIG. 11a, the small cells may be deployed outdoor. In such deployment, the following may be considered.

The small cells are deployed in the presence of an overlaid macro network
Separate frequency deployment of the macro cell and small cells
Outdoor small cell deployment
Small cell cluster is considered
The small cells are dense in cluster
Details regarding the number/density of small cells per cluster, backhaul link for coordination among small cells and time synchronization among small cells may also be considered.
Both ideal backhaul and non-ideal backhaul may be also considered for the following interfaces: an interface between the small cells within the same cluster and an interface between a cluster of small cells and at least one macro eNB
Non-ideal backhaul is assumed for all other interfaces FIG. 11b shows another example of the second scenario of small cell deployment.

Figure 11B:
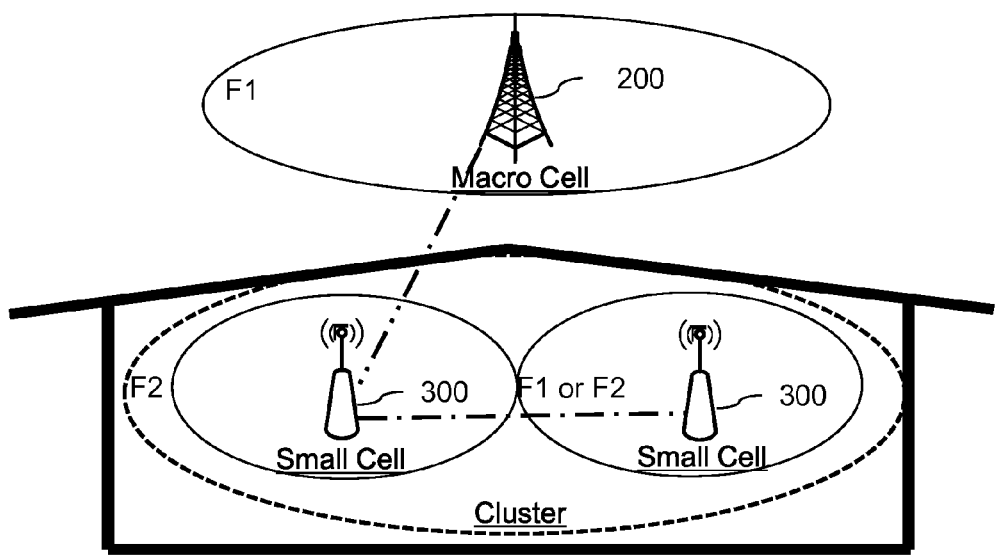
FIG. 11b shows another example of the second scenario of small cell deployment.

As shown in FIG. 11b, the small cells may be deployed indoor. In such deployment, the following may be considered.

The small cells are deployed in the presence of an overlaid macro network
Separate frequency deployment of the macro cell and small cells
Indoor small cell deployment is considered
Small cell cluster is considered
The small cells are dense in cluster
Details regarding the number/density of small cells per cluster, backhaul link for coordination among small cells and time synchronization among small cells may also be considered.
A sparse scenario can be also considered such as the indoor hotspot scenario.
Both ideal backhaul and non-ideal backhaul may be also considered for the following interfaces: an interface between the small cells within the same cluster and an interface between a cluster of small cells and at least one macro eNB
Non-ideal backhaul is assumed for all other interfaces.

Figure 12:
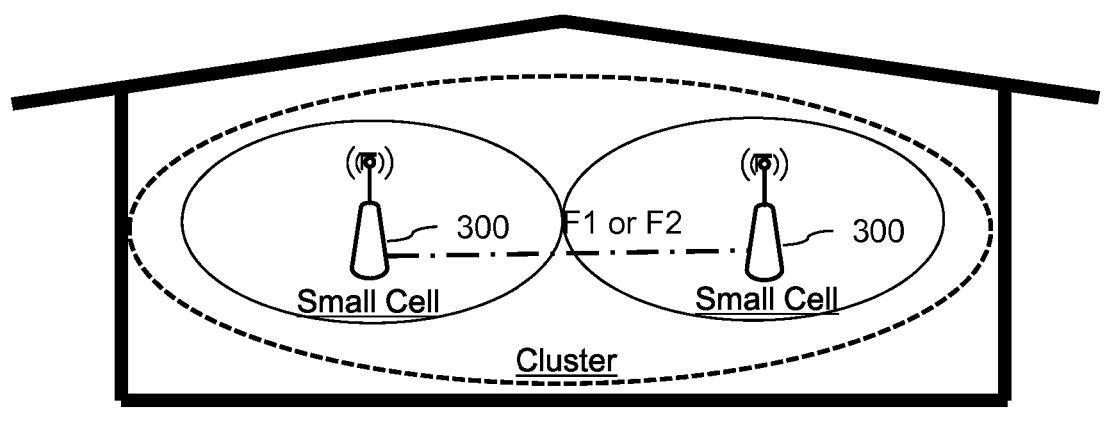
FIG. 12 shows one example of a third scenario of small cell deployment.

FIG. 12 shows one example of a third scenario of small cell deployment.

As shown in FIG. 12, the small cells may be deployed indoor. In such deployment, the following may be considered.

Macro cell coverage is not present
Indoor deployment scenario is considered
Small cell cluster is considered
The small cells are dense in cluster
Details regarding the number/density of small cells per cluster, backhaul link for coordination among small cells and time synchronization among small cells may also be considered.
A sparse scenario can be considered such as the indoor hotspot scenario.
Both ideal backhaul and non-ideal backhaul may be also considered for the following interfaces: an interface between the small cells within the same cluster.
Non-ideal backhaul is assumed for all other interfaces.

Figure 13:
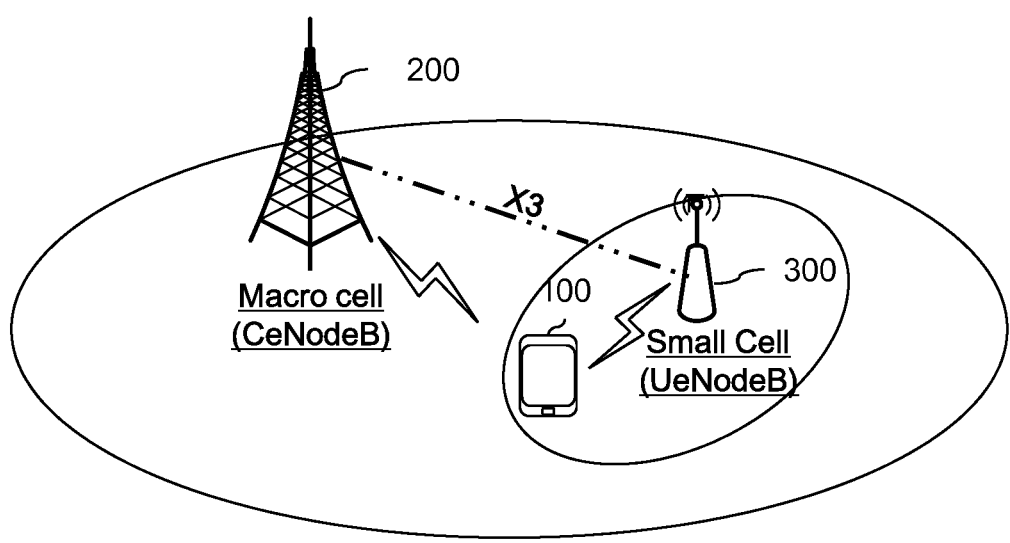
FIG. 13 shows a concept of dual connectivities

FIG. 13 shows a concept of dual connectivities

As illustrated in FIG. 13, the UE 100 has dual connectivities to both Macro cell and small cell. Here, the connectivity means the connection to eNodeB for data transfer. If the UE is served by both one macro cell and one small cell, it can be said that the UE has dual connectivities, i.e., one connectivity for the macro cell and another connectivity for the small cell. If the UE is served by small cells, it can be said that the UE has multiple connectivity.

The macro cell is served by a Macro eNodeB (hereinafter, "MeNodeB") and the small cell or group of small cells is served by a Small eNodeB (hereinafter, "SeNodeB"). Meanwhile, if a cell is responsible for managing control plane specific operations, e.g., RRC connection control and mobility, e.g., transfer of control data on signaling radio bearers (SRBs), an eNodeB of the cell may be called as User-plane eNodeB (hereinafter, "UeNodeB" or "UeNB"). On the other hand, if a cell is responsible for managing user plane specific operations, e.g., transfer of data on data radio bearers (DRBs), an eNodeB of the cell may be called as Control-plane eNodeB (hereinafter, "CeNodeB" or "CeNB").

In this FIG. 13, the MeNodeB corresponds to a CeNodeB and the SeNodeB corresponds to UeNodeB.

The small cell of UeNodeB is responsible for transmitting best effort (BE) type traffic, while the macro cell of the CeNodeB is responsible for transmitting other types of traffic such as VoIP, streaming data, or signaling data.

It is noted that there is X3 interface between CeNodeB and UeNodeB that is similar to conventional X2 interface between eNodeBs.

Figure 14:
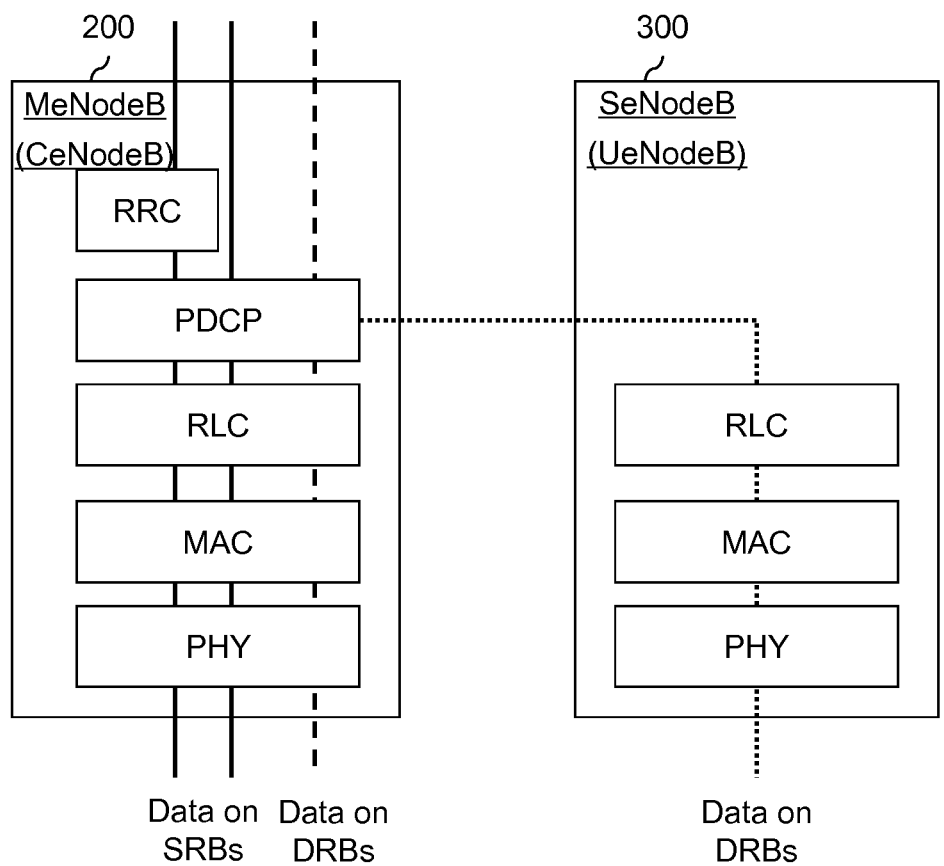
FIG. 14 shows radio protocols of eNodeBs for supporting dual connectivities.

FIG. 14 shows radio protocols of eNodeBs for supporting dual connectivities.

For dual or multiple connectivities, MAC functions of the UE 100 needs to be newly defined because from Layer 2 protocol point of view, RLC functions and configurations are bearer-specific while MAC functions and configurations are not.

To support dual or multiple connectivities, various protocol architectures are studied, and one of potential architectures is shown in FIG. 13. In this architecture, PDCP entity for UeNodeB is located in different network nodes, i.e. PDCP in CeNodeB.

As shown in FIG. 14, CeNodeB includes a PHY layer, a MAC layer, an RLC layer, a PDCH layer and an RRC layer while the UeNodeB includes a PHY layer, a MAC layer and an RLC layer. It is noted that the RRC layer and the PDCP layer exist only in the CeNodeB. In other words, there is the common RRC and PDCP layer and there is a set of RLC, MAC and PHY layers per connectivity. Accordingly, data on SRBs is signaled on CeNodeB and data on DRBs is signaled on either CeNodeB or UeNodeB according to the DRB configurations. That is, the CeNodeB can deliver data on DRBs in addition to control data on SRBs, while the UeNodeB can deliver data on only DRBs.

Here, the followings are considered:
CeNodeB and UeNodeB can be different nodes.
Transfer of data on SRBs is performed on CeNodeB.
Transfer of data on DRBs is performed on either CeNodeB or UeNodeB. Whether path of data on DRBs is on CeNodeB or UeNodeB can be configured by the eNodeB, MME, or S-GW.
There is X3 interface between CeNodeB and UeNodeB that is similar to conventional X2 interface between eNodeBs.
Because RRC connection reconfiguration is managed in the CeNodeB, the CeNodeB sends information about DRB configurations to UeNodeB via X3 interface.

Figure 15:
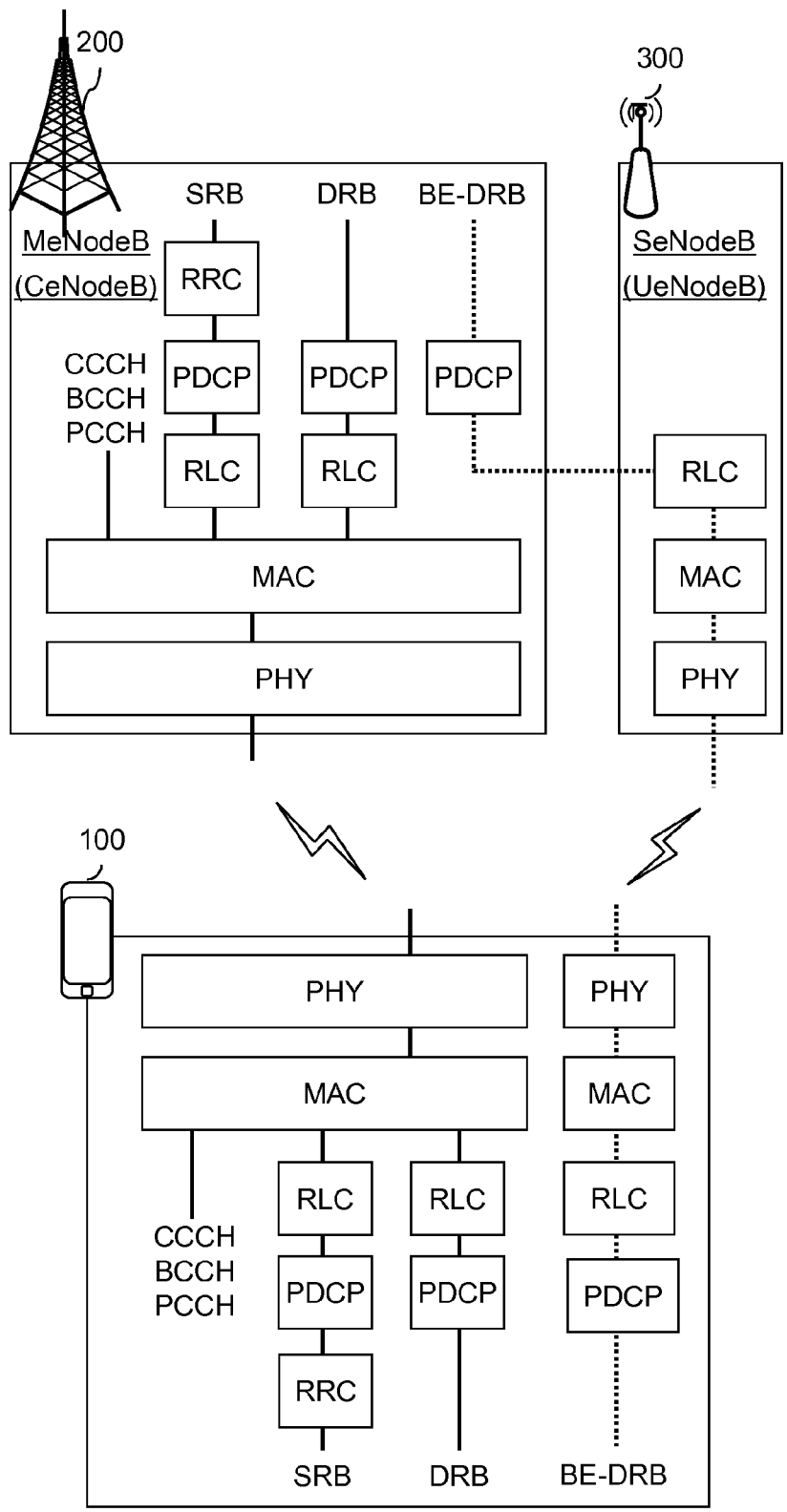
FIG. 15 shows radio protocols of UE for supporting dual connectivities.

FIG. 15 shows radio protocols of UE for supporting dual connectivities.

As shown in FIG. 15, the UeNodeB is responsible for transmitting best effort (BE) DRB. The CeNodeB is responsible for transmitting SRB and DRB. As above explained, PDCP entity for UeNodeB is located in CeNodeB.

As shown in FIG. 15, on the UE 100 side, there are plural MAC entities, i.e., M-MAC and S-MAC for macro cell of CeNodeB and small cells of UeNodeB. The M-MAC is responsible for transmission between the UE and the MeNodeB, and the S-MAC is in responsible for transmission between the UE and the SeNodeB. For the connectivity to UeNodeB, the UE 100 may include the PDCP entity, the RLC entity and the MAC entity which handle BE-DRB. For connectivity to CeNodeB, the UE 100 may include plural RLC entities, plural PDCP entities which handle SRB and DRB.

Also, as shown in FIG. 15, on the UE 100 side, there are two PHY entities in the UE, i.e., M-PHY and S-PHY. The M-PHY is linked to the M-MAC and the S-PHY is linked to the S-PHY.

Meanwhile, a scheduler in the UeNodeB and a scheduler in the CeNodeB independently schedule radio resources. There Accordingly, different from the centralized scheduler, each scheduler does not know whether the UE 100 is scheduled by other schedulers or not. Due to the fact, the management of transmit power of the UE 100 becomes complex.

If both schedulers in the MeNodeB and the SeNodeB perform aggressive resource allocation, the total transmit power of the UE 100 would easily exceed the maximum. Otherwise, if both schedulers in the MeNodeB and the SeNodeB perform conservative resource allocation, the total transmit power of the UE 100 would be underutilized.

<One Exemplary Solution According to the Present Disclosure>

Therefore, the present disclosure is aimed at providing a solution to the above-explained problem.

For the solution, the present disclosure provides one example technique. According to the one example technique, the UE may report PHR per a base station (i.e., eNodeB). The PHR per the base station may be called as per-eNodeB PHR. The per-eNodeB PHR may be defined as a difference between a UE's total uplink transmit power for cells of the eNodeB and a UE's total uplink transmit power for a particular cell of the eNodeB. In other words, The per-eNodeB PHR may be defined as a difference between a UE's total transmit power for a particular eNodeB and a UE's total PUSCH transmission power for the eNodeB. If the UE is configured with the per-eNodeB PHR and/or if the UE has connection with the MeNodeB and the SeNodeB, the UE triggers the Per-eNodeB PHR to any eNodeB, a particular eNodeB or all eNodeBs which the UE is connected to.

Such example technique will be explained in more detail.

Figure 16:
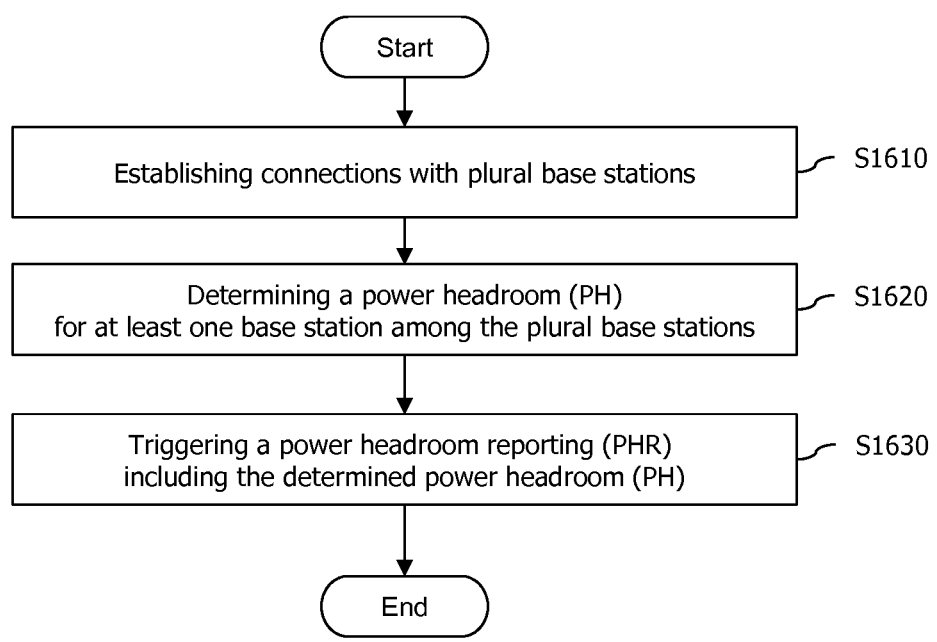
FIG. 16 shows one exemplary method for reporting a power headroom according the present disclosure.

FIG. 16 shows one exemplary method for reporting a power headroom according the present disclosure.

Referring to FIG. 16, the UE establishes connections with plural base stations (i.e., eNodeBs), each of which includes one or more cells (S1610). And, the UE determines power headroom (PH) for at least one base station among the plural base stations (S1620). Then, the UE triggers power headroom reporting (PHR) including the determined power headroom (PH) to the at least one base station (S1630).

The power headroom is determined per the base station (i.e., eNodeB). The power headroom (PH) per the base station may be called as per-eNodeB PH. The per-eNodeB PH is determined based on a difference between a UE's total uplink transmit power toward eNodeB and a UE's total PUSCH transmission power toward the eNodeB.

The UE's total uplink transmit power toward the eNodeB may be called as $P_{CMAX,e}$ and calculated based on the sum of all the configured UE transmit power ($P_{CMAX,e}$) for all the serving cell belonging to the eNodeB.

The $P_{CMAX,e}$ which is defined per toward the base station is an example, can be defined as one of followings $P_{CMAX,e}$ per cell or group of cells
$P_{CMAX,e}$ per scheduler
$P_{CMAX,e}$ per RF unit (chain)
$P_{CMAX,e}$ per physical (logical) connectivity
$P_{CMAX,e}$ per MAC, RLC, PDCP, RRC entity The UE's total PUSCH transmission power toward the eNodeB may be calculated based on the sum of the PUSCH transmission power for all the serving cells belonging to the eNodeB.

The PUSCH transmit power can include power for one, some, all of the followings

PUSCH with UCI
PUSCH without UCI
PUCCH
SRS
PRACH

The serving cell can be limited to the serving cell activated by the SCell Activation/Deactivation Command or the PDCCH/RRC messages. The serving cell can be limited to the serving cell for which the UL grant is available. The serving cell can be limited to the activated serving cell for which the UL grant is available.

The UE can be configured with per-eNodeB PHR by the eNodeB.

The following is an example in calculating Per-eNodeB PH.

First, assume that:
the UE has connections with the MeNodeB and the SeNodeB;
the UE is configured with serving cell 1, 2, 3 and 4;
the serving cell 1 and 2 belong to the MeNodeB and the serving cell 3 and 4 belong to the SeNodeB;
the configured UE transmit power for the serving cell 1, 2, 3, and 4 are $P_{CMAX,c1}$, $P_{CMAX,c2}$, $P_{CMAX,c3}$, and $P_{CMAX,c4}$, respectively,
The UE is scheduled with all the serving cell at subframe n (therefore, PUSCH power for serving cell 1, 2, 3, and 4 are $Power_{PUSCH1}$, $Power_{PUSCH2}$, $Power_{PUSCH3}$ and $Power_{PUSCH4}$, respectively), and
The UE triggers the PHR at subframe n.

Then, Per-eNodeB PHR for the MeNodeB (called MeNodeB PHR) is the difference between sum of $P_{CMAX,c1}$ and $P_{CMAX,c2}$, and sum of $Power_{PUSCH1}$ and $Power_{PUSCH2}$. Per-eNodeB PHR for the SeNodeB (called SeNodeB PHR) is the difference between sum of $P_{CMAX,c3}$ and $P_{CMAX,c4}$, and sum of $Power_{PUSCH3}$ and $Power_{PUSCH4}$.

When the UE triggers the PHR, the UE reports Per-cell PH (i.e., difference between the configured UE transmit power for the cell and the PUSCH power for the cell) and/or Per-eNodeB PH to the eNodeB. When reporting Per-eNodeB PH, the following options can be possible.

All the Per-eNodeB PHs are reported to all the eNodeBs. For example, Per-eNodeB PHs for the MeNodeB and the SeNodeB are reported to both the MeNodeB and the SeNodeB.

Alternatively, the Per-eNodeB PH for the one eNodeB is reported to the other eNodeB. That is, Per-eNodeB for the MeNodeB is reported to the SeNodeB and the Per-eNodeB PH for the SeNodeB is reported to the MeNodeB.

Alternatively, the Per-eNodeB PH for the MeNodeB and/or the SeNodeB is reported only to the MeNodeB or the SeNodeB.

Per-eNodeB PH can be configurable per serving cell.

If the UE reports the Per-cell PH and Per-eNodeB PH together, an improved

MAC CE accommodating them can be introduced as follows.

FIG. 17 shows an example of an improved MAC CE according to the present disclosure.

As shown in FIG. 17, the improved MAC CE may accommodate per-cell PH and per-eNodeB PH.

In FIG. 17, the X field indicates whether there will be Per-eNodeB PH or not. The Per-eNodeB PH indicates the power headroom for the Per-eNodeB PH for the eNodeB specified or the eNodeB indicated by the configuration. For example, when Per-eNodeB PH for the SeNodeB is specified or indicated to be reported to the MeNodeB, the UE includes the Per-eNodeB PH for the SeNodeB when reporting PHR to the MeNodeB. Vice versa, the UE includes Per-eNodeB for the MeNodeB when reporting PHR to the SeNodeB.

The ways or methods to solve the problem of the related art according to the present disclosure, as described so far, can be implemented by hardware or software, or any combination thereof.

Figure 18:
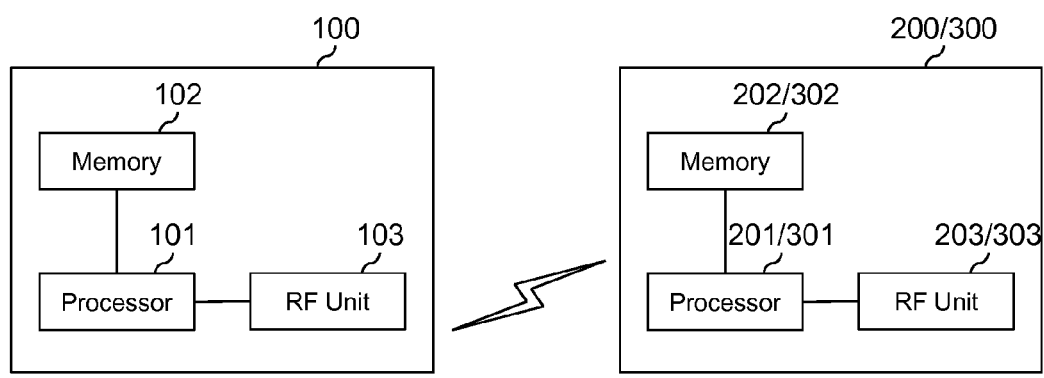
FIG. 18 is a block diagram showing a wireless communication system to implement an embodiment of the present invention.

FIG. 18 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The eNodeB (including CeNodeB and UeNodeB) 200/300 includes a processor 201/301, memory 202/302, and an RF unit 203/303. The memory 202/302 is connected to the processor 201/301 and configured to store various information used for the operations for the processor 201/301. The RF unit 203/303 is connected to the processor 201/301 and configured to send and/or receive a radio signal. The processor 201/301 implements the proposed functions, processed, and/or methods. In the described embodiments, the operation of the eNodeB may be implemented by the processor 201.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting a power headroom, the method comprising:
configuring, by a user equipment (UE), a first medium access control (MAC) entity for a first connectivity with a first base station including one or more cells;
configuring, by the UE, a second MAC entity for a second connectivity with a second base station including one or more cells,
wherein the first MAC entity and the second MAC entity operate independently;
determining, by the second MAC entity of the UE, a first power headroom (PH) for the second base station;
determining, by the second MAC entity of the UE, a second PH for at least one cell belonging to the second base station;
triggering, by the second MAC entity of the UE, a power headroom reporting (PHR) for the second base station,
wherein the PHR for the second base station includes:
the first PH for the second base station,
the second PH for the at least one cell belonging to the second base station, and a field indicating that the PHR includes the first PH for the second base station; and transmitting, by the UE, the PHR for the second base station to the first base station.

2. The method of claim 1, wherein:

the at least one cell is an activated cell; and the UE receives an uplink grant with respect to the at least one cell.

3. The method of claim 1, further comprising:

determining, by the first MAC entity of the UE, a third PH for the first base station;

determining, by the first MAC entity of the UE, a fourth PH for at least one cell belonging to the first base station; and triggering, by the first MAC entity of the UE, a PHR for the first base station.

4. The method of claim 1, wherein the first PH is determined based on a difference between a UE's total uplink transmit power toward the second base station and a UE's total transmission power toward the second base station.

5. The method of claim 1, wherein the second base station is a small base station.

6. A terminal for performing random access procedure, the terminal comprising:

a transceiver; and a processor connected to the transceiver and configured to:

configure a first medium access control (MAC) entity for a first connectivity with a first base station including one or more cells; and configure a second MAC entity for a second connectivity with a second base station including one or more cells, wherein the first MAC entity and the second MAC entity operate independently, wherein the second MAC determines a first power headroom (PH) for the second base station, wherein the second MAC determines a second PH for at least one cell belonging to the second base station, wherein the second MAC triggers a power headroom reporting (PHR) for the second base station, wherein the processor is further configured to transmit the PHR for the second base station to the first base station, and wherein the PHR for the second base station includes:

the first PH for the second base station, the second PH for the at least one cell belonging to the second base station, and a field indicating that the PHR includes the first PH for the second base station.

7. The terminal of claim 6, wherein:

the at least one cell is an activated cell; and a UE receives an uplink grant with respect to the at least one cell.

8. The terminal of claim 6, wherein:

the first MAC entity determines a third PH for the first base station;

the first MAC entity determines a fourth PH for at least one cell belonging to the first base station; and the first MAC entity triggers a PHR for the first base station.

9. The terminal of claim 6, wherein the first PH is determined based on a difference between a UE's total uplink transmit power toward the second base station and a UE's total transmission power toward the second base station.

10. The terminal of claim 6, wherein the second base station is a small base station.

* * * * *